(12) United States Patent
Leppänen et al.

(10) Patent No.: US 10,878,244 B2
(45) Date of Patent: Dec. 29, 2020

(54) VISUAL INDICATOR (71) Applicant: NOKIA TECHNOLOGIES OY, Espoo (FI)

(72) Inventors: Jussi Leppänen, Tampere (FI); Antti Eronen, Tampere (FI); Arto Lehtiniemi, Lempäälä (FI); Francesco Cricri, Tampere (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 108 days.

(21) Appl. No.: 16/087,451

(22) PCT Filed: Mar. 27, 2017

(86) PCT No.: PCT/FI2017/050212
§ 371 (c)(1),
(2) Date: Sep. 21, 2018

(87) PCT Pub. No.: WO2017/168046
PCT Pub. Date: Oct. 5, 2017

(65) Prior Publication Data
US 2019/0102627 A1 Apr. 4, 2019

(30) Foreign Application Priority Data
Mar. 30, 2016 (EP) .................................. 16162739

(51) Int. Cl.
*G06K 9/00* (2006.01)
*G06F 3/0481* (2013.01)
(Continued)

(52) U.S. Cl.
CPC ........ *G06K 9/00711* (2013.01); *G02B 27/017* (2013.01); *G06F 3/04815* (2013.01);
(Continued)

(58) Field of Classification Search
CPC ...... G06K 9/00711; G06K 2009/00738; G06F 3/04842; G06F 3/04815; H04N 21/8133; G02B 27/017; G02B 2027/014
(Continued)

(56) References Cited

U.S. PATENT DOCUMENTS

2011/0246908 A1* 10/2011 Akram ................ H04N 21/27
715/752
2014/0247343 A1* 9/2014 Chen ..................... G06Q 50/01
348/135
(Continued)

FOREIGN PATENT DOCUMENTS

EP    2 978 190 A1    1/2016

OTHER PUBLICATIONS

International Search Report & Written Opinion dated Jul. 4, 2017 corresponding to International Patent Application No. PCT/FI2017/050212.
(Continued)

*Primary Examiner* — Van D Huynh
(74) *Attorney, Agent, or Firm* — Squire Patton Boggs (US) LLP (57) ABSTRACT A method comprising: creating a visual indicator based on at least one of visual analysis or audio analysis performed for a content comprising at least one visual element, wherein the visual indicator is selectable such that upon a selection of the visual indicator, access to the content is provided.

20 Claims, 5 Drawing Sheets (51) Int. Cl.
*G06F 3/0484* (2013.01)
*G02B 27/01* (2006.01)
*H04N 21/81* (2011.01)

(52) U.S. Cl.
CPC ..... *G06F 3/04842* (2013.01); *H04N 21/8133* (2013.01); *G02B 2027/014* (2013.01); *G06K 2009/00738* (2013.01)

(58) Field of Classification Search
USPC ........................................................ 382/103
See application file for complete search history.

(56) References Cited

U.S. PATENT DOCUMENTS

| 2016/0093078 A1* | 3/2016 | Davis | G06T 17/20 |
| | | | 345/629 |
| 2017/0064363 A1* | 3/2017 | Wexler | H04N 21/44218 |
| 2017/0068508 A1* | 3/2017 | Cricri | H04S 7/30 |

OTHER PUBLICATIONS

Communication pursuant to Article 94(3) EPC issued in corresponding European Patent Application No. 16 162 739.3-1203, dated May 25, 2020.

* cited by examiner

VISUAL INDICATOR

TECHNICAL FIELD

The present application relates to multimedia and more specifically to virtual reality

BACKGROUND

Various devices may allow a user to watch content that includes virtual reality content or augmented reality content.

SUMMARY

According to various, but not necessarily all, embodiments of the invention there is provided a method comprising: creating a visual indicator based on at least one of visual analysis or audio analysis performed for a content comprising at least one visual element, wherein the visual indicator is selectable such that upon a selection of the visual indicator, access to the content is provided.

According to various, but not necessarily all, embodiments of the invention there is provided an apparatus, comprising: means for creating a visual indicator based on at least one of visual analysis or audio analysis performed for a content comprising at least one visual element, wherein the visual indicator is selectable such that upon a selection of the visual indicator, access to the content is provided.

According to various, but not necessarily all, embodiments of the invention there is provided computer program code that, when performed by at least one processor, causes at least the following to be performed: creating a visual indicator based on at least one of visual analysis or audio analysis performed for a content comprising at least one visual element, wherein the visual indicator is selectable such that upon a selection of the visual indicator, access to the content is provided.

One or more computer programs may comprise the computer program code. The one or more computer programs may be stored on one or more non-transitory computer readable mediums.

According to various, but not necessarily all, embodiments of the invention there is provided an apparatus, comprising: at least one processor; and at least one memory storing computer program code that is configured, working with the at least one processor, to cause the apparatus to perform at least: creating a visual indicator based on at least one of visual analysis or audio analysis performed for a content comprising at least one visual element, wherein the visual indicator is selectable such that upon a selection of the visual indicator, access to the content is provided.

According to various, but not necessarily all, embodiments of the invention there is provided examples as claimed in the appended claims.

BRIEF DESCRIPTION OF THE DRAWINGS

For a better understanding of various examples that are useful for understanding the detailed description, reference will now be made by way of example only to the accompanying drawings in which.

DETAILED DESCRIPTION

In case two or more users, in same or different locations, are watching content, which may or may not be same content, they would benefit from knowing what one or more of the other users are watching and if it seems interesting, being able to access the content being watched by one or more of the others.

Virtual reality may be one form of content that could be viewed by the users. Virtual reality may be understood as an artificial environment that is created with software and presented to the user in such a way that the user may accept it as a real environment. One form of virtual reality is a 3D image that can be explored interactively at a personal computer or other suitable user equipment such as for example a wrap-around display screen that may be worn around the user's head or actual rooms that may be augmented with wearable computer devices. Virtual Reality may be used for example in developing an imagined environment for a game or an interactive story, such as an interactive movie for example and/or for simulation of a real environment for training and education purposes for example. The virtual reality content could be captured for example by a so called 360 degree or 720 degree camera. These are cameras that are capable of capturing the complete, or a substantial portion of the field of view surrounding the capturing device by having for example a 360 degree horizontal field of view and in some cases in addition also 360 degree vertical field of view as well thereby capturing the full surrounding environment of the capturing device. Such devices may also be capable of capturing the audios scene surrounding the device using spatial audio capture technologies.

In addition to virtual reality, the users may also watch augmented reality content. Augmented reality content may be understood to be direct or indirect view of a physical real-world environment whose elements are augmented or supplemented by computer-generated input which may be for example sound, video or graphics input. It is further possible that a user is watching content that is captured from the real world surroundings of the user. In other words, video feed is recorder in the real environment and the user may be able to watch that content either real-time or the content may have been pre-recorded. This may be referred as presence capture.

Figure 1:
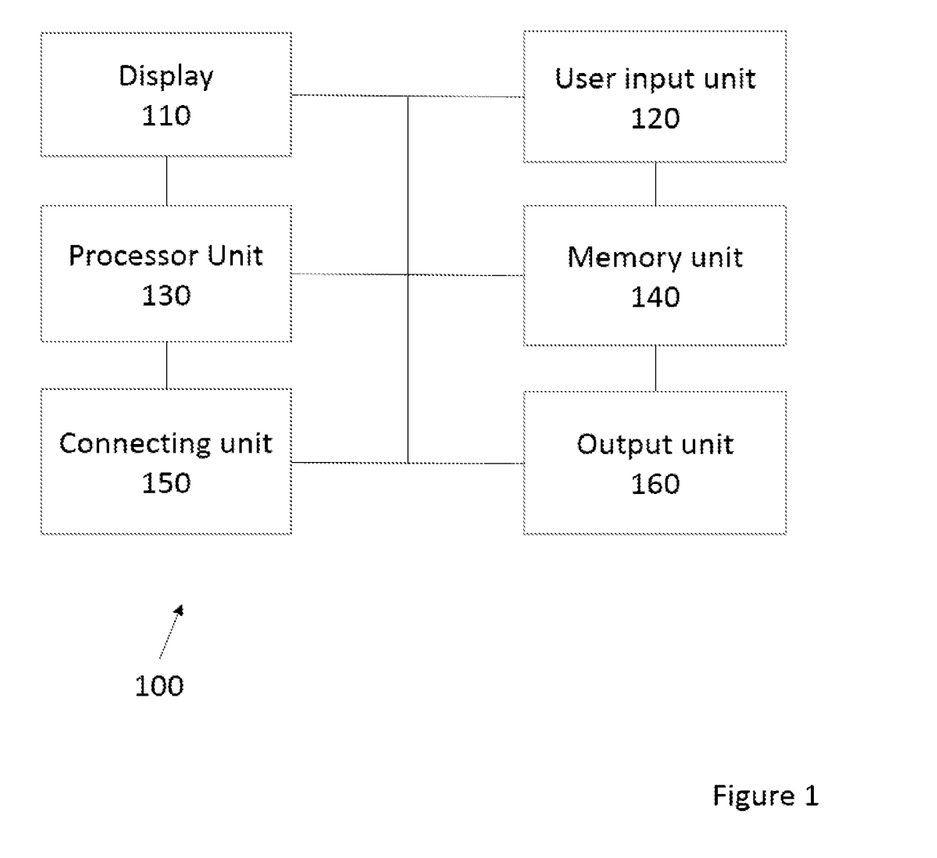
FIG. 1 illustrates a schematic of a virtual reality device.

FIG. 1 illustrates a virtual reality device 100. Virtual reality device 100 is a device that enables a user to view computer-simulated reality, which may also be called virtual reality. Computer-simulated reality (i.e. immersive reality) replicates an environment that simulates physical presence in the real world or in an imaginary world. User may also be enabled to interact with the computer-simulated reality by using the virtual reality device. The virtual reality device may artificially create sensory experiences that may include for example sight, hearing, touch and smell experiences. In some example embodiments, the user's field of view comprises only a part of the artificially created sensory experience. Alternatively, the user's field of view may comprise the whole artificially created sensory experience. Additionally, in some example embodiments the artificially created sensory experience fills only a part of the user's field of view or alternatively, fills the whole field of view of the user. A virtual reality device 100 comprises a display 110. The display 110 is able to display visual content to a user. The display 110 may be head-worn display such as a stereoscopic display or it may be an external display, such as a computer screen or a TV, for example. The display 110 may also be able to display 2D and/or 3D visual content.

The virtual reality device 100 may also comprise a user input unit 120. The user input unit 120 enables a user to provide input to the virtual reality device 120 and, additionally or alternatively, detect movements and or intentions of a user. The user input unit 120 may comprise for example, touch input detection, physical buttons, microphone, movement sensors, eye-tracking sensors, sensor for tracking electrical currents of the user, such as EEG, and/or connected input devices that are to be held by a user. It is to be noted that this listing is not exhaustive and other solutions may be used as well. An example purpose of the user input unit 120 is to allow user to provide commands to the virtual reality device 100. This may be achieved, for example, if the user presses a button of the virtual reality device 100, touches a touch detection enabled part of the virtual reality device 100 etc. Another example purpose of the user input unit 120 is that the device may detect the user's reactions by utilizing information form one or more sensors of the virtual reality device 100. The one or more sensors may for example detect the amount of tilting or the orientation of a user's head, the movement of the user's hand of other body parts, recognizing gestures made by a user the gazing of the user's eyes etc. A further example purpose of the user input unit 120 may be detecting user's intention by combining and analyzing data from eye-tracking and EEG sensors for example.

The virtual reality device 100 comprises a processing unit 130. The processing unit 130 may comprise one or more processing cores. The processing unit may further comprise a single chip or multiple chips. The chips may be multi-purposes or single purpose processors. The processing unit 130 is capable of executing instructions. For example, instructions retrieved from a memory unit, can be executed by the processing unit 130 and thereby the processing unit 130 may control the reception and manipulation of input and output data between components of the virtual reality device 100.

The virtual reality device 100 comprises a memory unit 140. The memory unit 140 may comprise computer hardware devices used to store information for immediate use in a computer. The memory unit 140 may be an internal memory unit or an external memory unit or a combination of both. The memory unit 140 may further be volatile or non-volatile memory.

The virtual reality device 100 may further comprise a connecting unit 150. The connecting unit 150 may enable the virtual reality device 100 to connect to other, external, devices. The connecting unit 150 may comprise wired and/or wireless connection capabilities. Examples of such connection capabilities comprise near field communication unit, local area network, Bluetooth, cellular or satellite communication links, wireless local area links. The connecting unit 150 may further comprise, additionally or alternatively, implement telecommunication links suited for establishing links with other users or for data transfer, e.g. using the Internet.

The virtual reality device 100 may further comprise an output unit 160. The output unit 160 may comprise audio output hardware such as loudspeakers or headphones for example. It may further comprise haptic feedback enabling hardware. For example, the user may feel a vibration when the haptic feedback enabling hardware is activated. Another example of feedback received by a user may be air flow produced by rotating fans for example. Other outputs are also possible.

The virtual reality device 100 may further comprise software stored in the memory unit 140. The software may comprise one or more software modules in the form of a computer program product that is software stored in a memory medium, which may comprise any non-transitory media or means that can contain, store, communicate, propagate or transport the instructions for use by or in connection with an instructions execution system, apparatus or device.

The virtual reality device 100 may be a single device or alternatively, a plurality of devices that are connected may form the virtual reality device 100. For example, the virtual reality device 100 may have a head-worn device comprising a display 110 and a separate connected input unit 120 that the user may hold. In another example embodiment, the virtual reality device 100 is a device with display 110 being a separate unit and the output unit 160 being a separate unit as well. Other set-ups may also exist.

Figure 2:
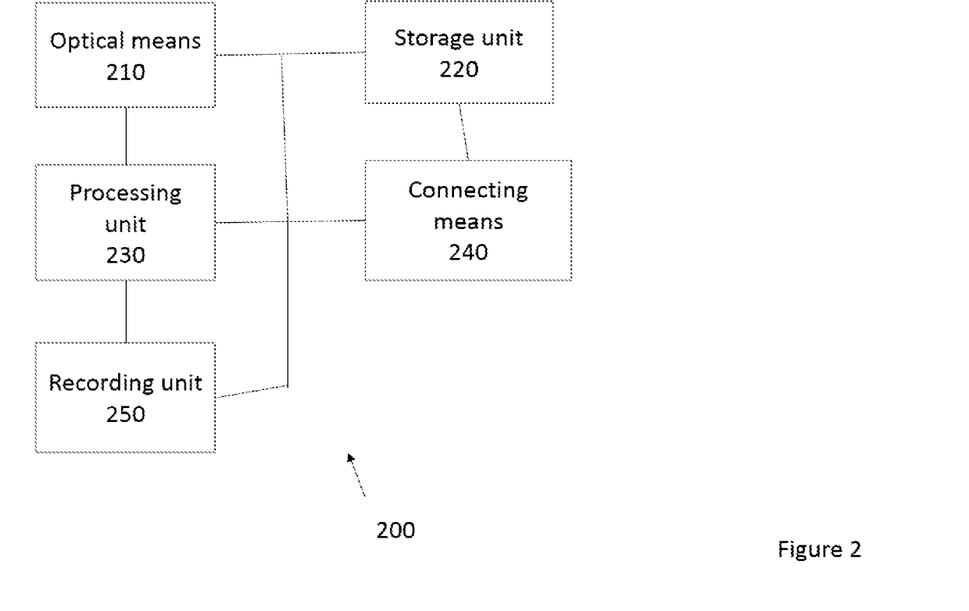
FIG. 2 illustrates a schematic of a virtual reality capture device.

FIG. 2 represents a virtual reality capture device 200. The virtual reality capture device 200 is a device that enables capture of content that contains one or more visual elements. A visual element is a visual feature that can be recognized by a user as an entity such as for example a person, an animal, a car, sand, water, field, sky, clouds etc. The content comprising at least one visual element may be used as content for a virtual reality device such as virtual reality device 100. The virtual reality capture device 200 may comprise optical means 210 for recording visual captures such as cameras. The optical means 210 may comprise a plurality of cameras enabling capturing of content comprising at least one visual element from various angles. The optical means 210 may be placed such that they capture content comprising at least one visual element from one or more parts of the environment surrounding the virtual reality capturing device 200 or alternatively, the optical means 210 may be placed such that they capture content comprising at least one visual element spherically around the virtual reality capturing device 200.

Once the optical means 210 have captured the visual recording, the visual recording may be stored. The storing may be performed by the storage unit 220 of the virtual reality capturing device 200. The storage unit 220 may comprise hardware capable of storing information, such as content comprising at least one visual element, such as memory, which may be volatile or non-volatile and it may be internal or external. Alternatively, the virtual reality capturing device 200 may not have a storage unit 220, or the storage unit 220 stores information other than content comprising at least one visual element. For example, the storage unit may comprise software. The software may comprise one or more software modules in the form of a computer program product that is software stored in a memory medium, which may comprise any non-transitory media or means that can contain, store, communicate, propagate or transport the instructions for use by or in connection with an instructions execution system, apparatus or device. In some example embodiments, the content may be real-time content. In such a case the content captured by the optical means 210 is stored by the storage unit 220 such that it can then be delivered to the device of the user in real-time.

The virtual reality capturing device 200 may further comprise a processing unit 230. The processing unit 230 may comprise one or more processing cores. The processing unit may further comprise a single chip or multiple chips. The chips may be multi-purposes or single purpose processors. The processing unit 230 is capable of executing instructions. For example, instructions retrieved from a memory, can be executed by the processing unit 230 and thereby the processing unit 230 may control the reception and manipulation of input and output data between components of the virtual reality capturing device 200.

The virtual reality capturing device 200 may further comprise connecting means 240. Connecting means 240 may enable the virtual reality capturing device 200 to connect to other, external, devices. Connecting means 240 may comprise wired and/or wireless connection capabilities. Examples of connection capabilities comprise near field communication unit, local area network, Bluetooth, cellular or satellite communication links, wireless local area links. The connecting means 240 may further comprise, additionally or alternatively, implement telecommunication links suited for establishing links with other users or for data transfer, e.g. using the Internet.

The virtual reality capturing device 200 may further comprise audio recording unit 250. Audio recording unit 250 is capable of recording audio surrounding the virtual reality capturing device 200. The audio recorded may be spatial audio. The recorded audio may be associated to the captured visual content.

Figure 3:
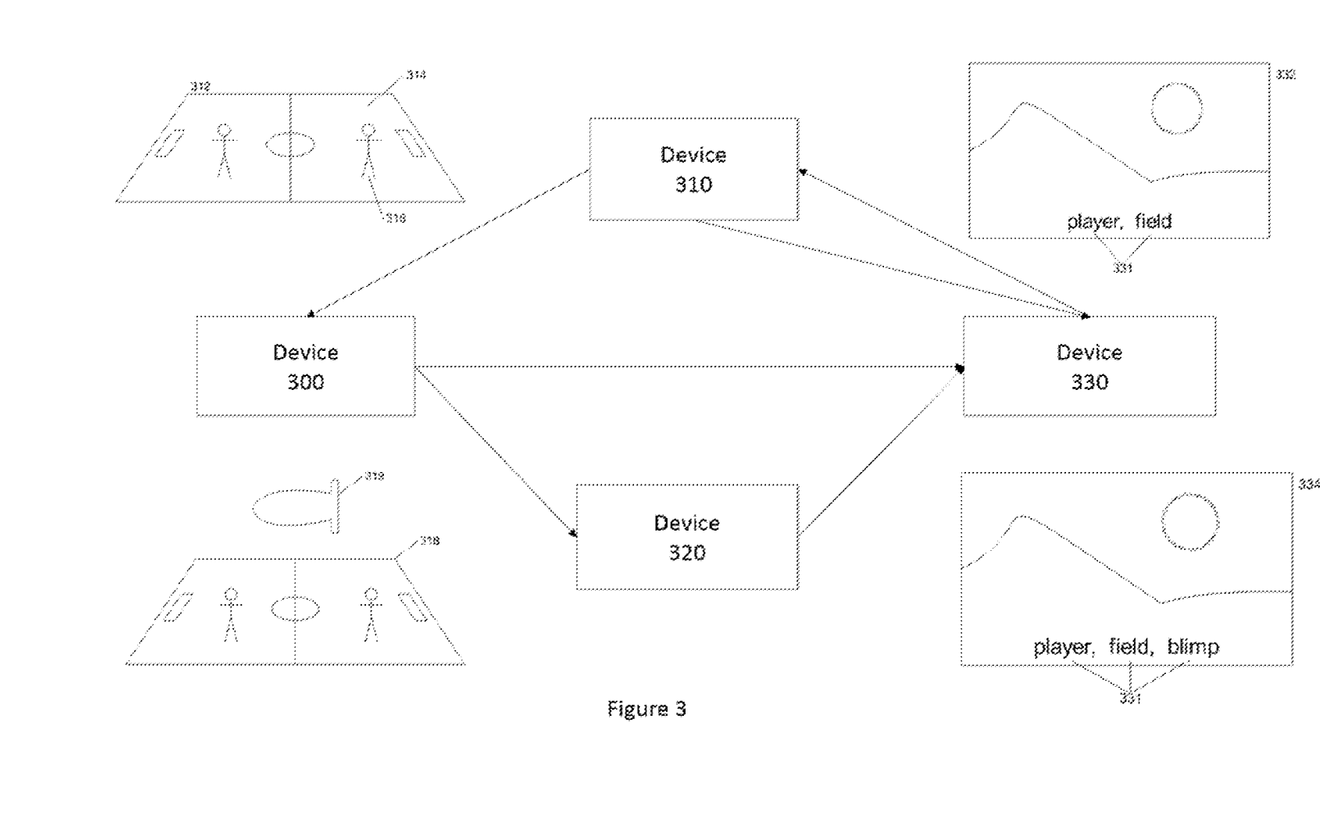
FIG. 3 illustrates a virtual reality setup.

The virtual reality capturing device may be a single body device or it could be formed of multiple connected devices that are functioning as one virtual reality capturing device 200. FIG. 3 illustrates a setup in which there is a device 300, which can be for example a virtual reality device such as virtual reality device 100 or it may be any other suitable device as well. The device 300 displays content 312 that contains at least one visual element 314, 316. The content 312 that contains at least one visual element 314, 316 may be for example video content. The video content may have been captured by device 310, which may be for example a virtual reality capturing device such as virtual reality capturing device 200. The device 300 and the device 310 are connected to each other by utilizing for example wireless connectivity means or any other suitable connectivity means. The connection may be created between the device 300 and the device 310 directly or via a third device 320 such as a server, cloud-computing setup or a personal computer for example. The device 300 may have the content stored to the device 300 or alternatively, it may be provided directly by device 310 or it may also be provided by the third device 320. The content 312 that contains at least one visual element 312 may be displayed by the device 300 as real-time video or the content 312 that contains at least one visual element 314, 316, may have been previously captured. It is also possible that the content 312 comprising at least one visual element 314, 316 had been modified by using software algorithms before the content 312 comprising at least one visual element 314, 316 is displayed by the device 300. Such software algorithms may relate to for example compression of video, analyzing of the content of the video or improving the quality perceived by a user. The execution of such software algorithms may be performed by any on the devices 300, 310 and/or 320.

As the device 300 displays the content 312 comprising at least one visual element 314, 316, at least one of a visual analysis or audio analysis is performed to the content 312 comprising at least one visual element 314, 316. The visual analysis may be performed to the content 312 such that all of the content is analyzed or alternatively, only the part of the content 312 that overlaps with the user's field of view is analyzed. The visual analysis may be for example an object recognition algorithm such as an algorithm based on 3D shape-based object recognition system or an algorithm for recognizing certain shapes or patterns from an image. Alternatively or additionally, the visual analysis may be done using an algorithm for scene analysis and/or activity classifier. It is to be noted that any algorithm capable of recognizing visual features may be used. The purpose of the visual analysis is to identify visual features, such as the visual elements 314 and 316 of content such as content 312. The visual analysis may be performed by any of the devices 300, 310 and/or 320. Alternatively or additionally a combination of the devices 300, 310 and 320 may also be used to perform the visual analysis. The visual analysis may be performed prior to displaying the content 312 comprising at least one visual elements 314, 316, or alternatively or additionally, the visual analysis may be performed as the content 312 comprising at least one visual element 314, 316 is displayed by the device 300. The visual analysis may be done once or the visual analysis may be performed continuously or periodically.

Alternatively or additionally, an audio analysis may be performed to at least one visual element 314 or 316. The audio analysis may comprise software algorithms which, when executed, are capable of recognizing an object or a context which correlates to a visual element, such as visual elements 314 or 316. In an example embodiment, a visual element, such as a dog, may be detected by a visual analysis to be a dog and additionally, an audio analysis recognizes barking and thus it is determined that there is a dog. In another example embodiment, an audio analysis recognizes a gun shot and, consequently, a gun is identified as a visual element.

Once the visual elements, such as the visual elements 314 and 316 have been identified by performing the at least one of visual analysis or audio analysis for the content 312 containing at least one visual element 314, 316, an identified visual element is used in order to create a visual indicator. The visual indicator is an indicator that provides an indication of the visual element identified by the at least one of visual analysis or audio analysis. For example, if a car has been identified by the visual analysis to be a visual element, then the visual indicator is used to convey information that the visual element identified by the visual analysis is a car. This can be done by representing the visual indicator as the text "car", as a drawing of a car or by any other suitable means. The visual indicator may be such that can be displayed in an unobtrusive manner such as a text on a lower part of a display, an opaque image or any other suitable means. In another example embodiment, an audio analysis has identified a singer as a visual element. Then a visual indicator comprising text "singer" may be created. Additionally, the visual analysis may also be used to detect the singer as a visual element. In such case, both the visual analysis and the audio analysis are used to create the visual indicator comprising "singer". In the example embodiment of FIG. 3, the visual analysis has identified from the content 312 visual element 314, which is a football field, and a visual element 316, which is a player. The visual indicator for the visual element 314 in this example embodiment is the visual indicator 331 in the form of text "field" and the visual indicator for the visual element 316 in this example embodiment is the visual indicator 331 in the form of text "player".

The visual indicators 331 are such that they may be transmitted to one or more other devices. The visual indicators may both be transmitted, or alternatively, in some example embodiments, one of them is transmitted in case it is determined, based on a criteria defined by a user for example, that one of the visual indicators 331 is such that it should not be transmitted. Alternatively, in some example embodiments, both visual indicators 331 may be such that they should not be transmitted. In this example embodiment, both visual indicators 331 are transmitted to another device 330. The visual indicators 331 in this example embodiment are representing visual elements 314 and 316 visible to a user by the way of the device 300 displaying those. The visual indicators 331 may be transmitted simultaneously or separately.

The transmitting of the visual indicators and may be enabled only if the recipient device is a device that has been identified as a device to which the visual indicators 331 can be transmitted to. In case the recipient device is not identified, the indicators are not transmitted. The identification can be done for example by using a pairing operation of devices, using a pre-determined list of identified devices and/or having a service to which the devices need to subscribe to in order to be able to transmit visual identifiers. Alternatively, it may be possible to transmit a visual indicator to a device without identifying the recipient device first.

In this example embodiment, the device 300 and the device 330 subscribe to a service that allows transmittance of visual indicators between different devices. If two devices are connected in the service, transmittance of a visual indicators between those devices is enabled. The devices may be connected, for example, if the users of the devices have recognized each other as a contact to whom a visual indicator may be transmitted to. There may be alternative ways to identify that the devices may transmit visual indicators to each other.

A visual indicator is a selectable such that upon selection of the visual indicator, it provides an access to the content for which the at least one of visual analysis or audio analysis recognized the visual element indicated by the visual indicator. The access may be provided to the content such that the visual element, based on which the visual indicator was created, is visible. In this example embodiment, if the visual indicator 331 is selected at the device 330, the device 330 gains access to the content 312 such that the visual element 314 is visible if the device 330 displays the content 312 after accessing it. Additionally or alternatively, if the visual indicator 331 is selected, the device 330 gains access to the content 312 such that the visual element 316 is visible if the device 330 displays the content 312 after accessing it. The selection may be performed by a user of the device 330. Any suitable means of selection may be used such as for example clicking on the visual indicator, providing a touch input on the visual indicator, looking at the visual indicator, providing a speech input command etc. In this example embodiment, if the user of the device 330 wishes to select the visual indicator 331 or the visual indicator 331, the user may utilize the input means of the device 330 to do so.

As the visual indicator is used to provide access to the content, the visual indicator needs to contain information regarding what the content is, how it can be accessed and optionally also, which part of the content to provide for display after accessing the content. This information may be for example metadata associated with the visual indicator. In this example embodiment, the visual indicators 331 provide information to the device 330 as for how to access the content 312 and to offer to display the part of the content that contains the visual element 314, in case the visual indicator 331 "field" was selected, or the visual element 316 in case another visual indicator 331 "player" was selected.

As the device 300 continues to display the content 312 with at least one visual element 314, 316, the at least one of visual analysis or audio analysis detects a further visual element, the visual element 319. The visual element 319 may therefore be used for creating a further visual indicator, visual indicator 331, which may be further transmitted to the device 330. Should the visual indicator 331 be selected at the device 330, the device 330 may access the content such that the visual element 319 is visible once the content 312 is displayed by the device 330.

Figure 4:
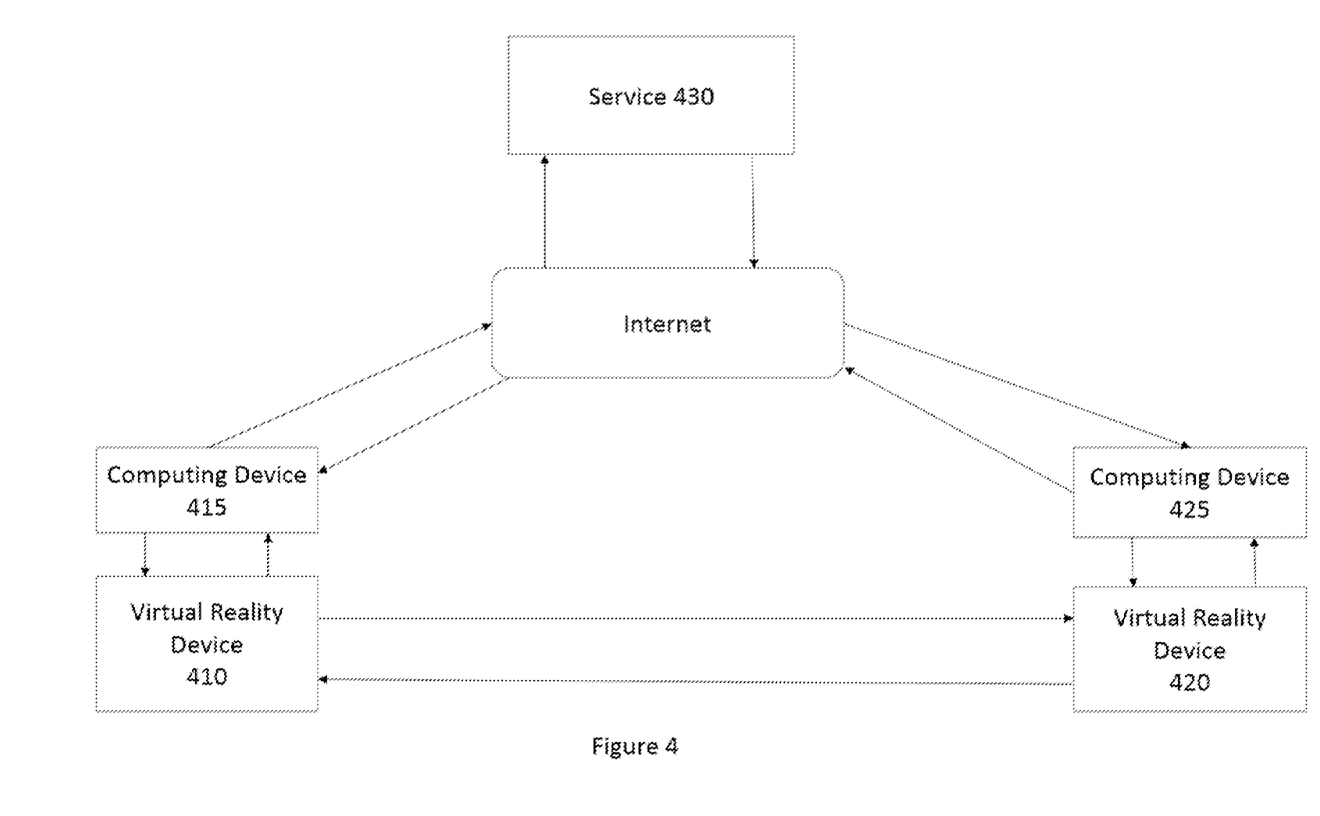
FIG. 4 illustrates another virtual reality setup.

FIG. 4 illustrates a further example embodiment. In this example embodiment, a first user is watching virtual reality video content, which is content comprising at least one visual element, using virtual reality device 410, which is a virtual reality device such as the device 100 of FIG. 1. The virtual reality device 410 is connected to a computing device 415. In this example embodiment, the computing device 415 is a personal computer of the first user, but other computing devices could alternatively or additionally be used. As the virtual reality video content is displayed to a user, the computing device 415 receives parts of the virtual reality content periodically. Once a part of the virtual reality content is received, the computing device 415 performs at least one of visual analysis or audio analysis for the capture to identify one or more visual elements. If a visual element is identified, a visual indicator indicating the visual element is created. The visual indicator is then transmitted to a service 430 using the Internet, or alternatively, any suitable network or the combination of both. The service then can be accessed by a second computing device 425. In this example embodiment, the computing device 425 is a personal computer of the first user, but other computing devices could alternatively or additionally be used. The computing device 425 may then provide the visual indicator to the virtual reality device 420, which is a virtual reality device such as the virtual reality device 100 of FIG. 1. The virtual reality device 420 is used by a second user to view virtual reality content, which is different than the virtual reality content viewed by the first user. As the virtual reality device 420 displays the virtual reality content, the visual indicator, which was created based on the content of the virtual reality device 410 and received from the computing device 425 may also be displayed. The visual indicator displayed may enable the second user to know what the virtual reality device 410 displays to the first user. If the second user now wishes the virtual reality device 420 to display the same virtual reality content as the virtual reality device 410, the user may select the visual indicator. Upon selecting the visual indicator, the computing device 425 receives an instruction from the virtual reality device 420 to retrieve the content the virtual reality device 410 displays from the service using the Internet. Once the virtual reality content displayed by the virtual reality device 410 is retrieved, it may be provided to the virtual reality device 420 such that the virtual reality device 420 may display it.

It is to be noted that in the same manner, it is also possible to perform at least one of visual analysis or audio analysis, by the computing device 425, for the virtual reality content displayed by the virtual reality device 420. The at least one of visual analysis or audio analysis may then identify visual elements that can be used to create visual indicator that may be transmitted to be displayed by the virtual reality device 410 in the same manner as described above in the context of visual indicator created based on the visual analysis performed for the virtual reality content displayed by the virtual reality device 410. This way, the first user may also be aware of what the second user sees being displayed by the virtual reality device 420. It is also to be noted that in the same manner as described previously, the first user may select the visual indicator and thereby access the virtual reality content being displayed by the virtual reality device 420.

It is to be noted that although the example embodiments above included, by way of example, two virtual reality devices, there may also be more virtual devices. For example, there can be more than one virtual reality devices to which the visual indicator is transmitted to. In an example embodiment, it is possible that the visual indicator is transmitted to several virtual reality devices and thereby multiple users may be aware of what certain user is watching and have the opportunity to access that content as well. Additionally or alternatively, it may also be possible that the at least one of visual analysis or audio analysis is performed on more than one content that comprises at least one visual element. In such an example embodiment, it is possible that visual indicators for more than one content are transmitted to one or more virtual reality devices. In order for a user to know which visual indicator relates to which content, the visual indicators may then be visually different such that the user may easily distinguish between various contents. For example, the color, font, visual appearance and/or location may vary according to the content.

In the example embodiments described above, it is possible that the visual indicators displayed are updated, periodically, as the visual content, from which the visual indicator changes, and/or as the field of view of the user whose content is analyzed changes. Additionally or alternatively, the visual indicators may be displayed by scrolling them for example in the lower part of the field of view of the user for example. A person skilled in the art realizes that any other suitable way of displaying the visual indicators is also possible.

Figure 5:
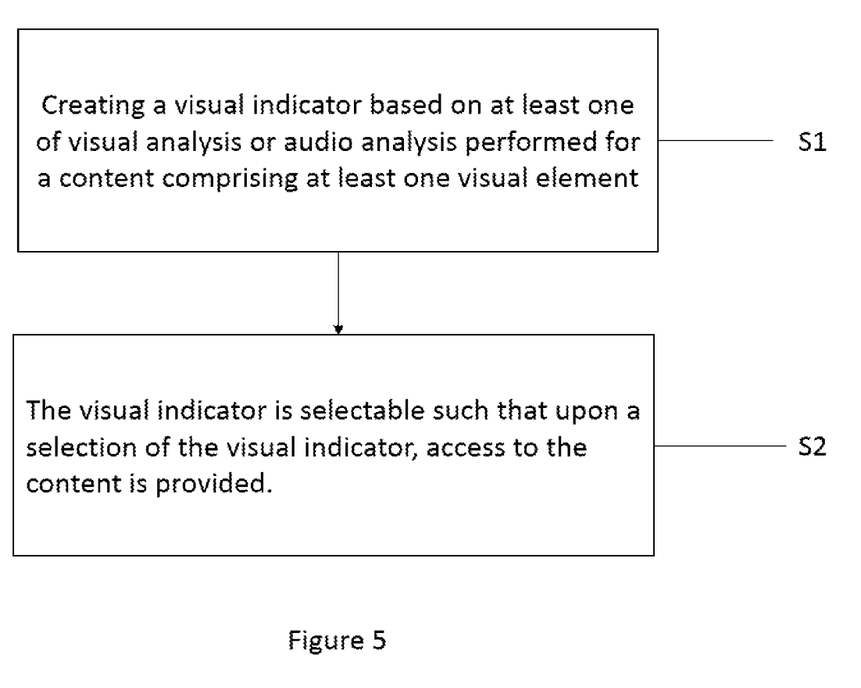
FIG. 5 illustrates a flow chart according to an example embodiment.

FIG. 5 illustrates an example embodiment in the form of a flow chart. First step, S1, comprises creating a visual indicator based on at least one of visual analysis or audio analysis performed for a content comprising at least one visual element. In the second step, S2, the visual indicator is selectable such that upon a selection of the visual indicator, access to the content is provided.

Some of the benefits of the invention include for example the possibility of a user being aware of what another user is watching and/or experiencing without the need to transmit the whole content. By using visual indicators to demonstrate what the other user is watching and/or experiencing, the bandwidth needed to transfer the visual indicator is significantly less than what is needed if the content itself is to be transferred.

Features described in the preceding description may be used in combinations other than the combinations explicitly described.

Although functions have been described with reference to certain features, those functions may be performable by other features whether described or not.

Although features have been described with reference to certain embodiments, those features may also be present in other embodiments whether described or not.

Whilst endeavoring in the foregoing specification to draw attention to those features of the invention believed to be of particular importance it should be understood that the applicant claims protection in respect of any patentable feature or combination of features hereinbefore referred to and/or shown in the drawings whether or not particular emphasis has been placed thereon.

The invention claimed is:

1. A method, comprising:
creating a visual indicator based on at least one of visual analysis or audio analysis performed for a content displayed by a first device comprising at least one visual element, wherein the visual analysis comprises an algorithm capable of recognizing the at least one visual element and the audio analysis comprises an algorithm capable of recognizing an object or a context which correlates to the at least one visual element; and
transmitting the visual indicator to a second device,
wherein the visual indicator is selectable in the second device such that upon a selection of the visual indicator, access to the content of the first device is provided.

2. The method according to claim 1, wherein the content comprises part of a video content displayed by the first device.

3. The method according to claim 2, wherein upon providing access to the content, the content is accessed such that a part of the content accessed corresponds to the part of the content the at least one of visual analysis or audio analysis was performed for.

4. The method according to claim 1, wherein the at least one of visual analysis or audio analysis is performed for a part of the content that is in a field of view of a user.

5. The method according to claim 1, wherein at least one of the first device or the second device comprises a virtual reality device.

6. The method according to claim 1, wherein the at least one of visual analysis or audio analysis is performed by a third device.

7. The method according to claim 1, wherein the selection of the visual indicator is performed by the second device.

8. The method according to claim 2, wherein the at least one of visual analysis or audio analysis is performed before the video content is displayed by the first device.

9. The method according to claim 1, wherein the visual indicator is transmitted to the second device by the first device.

10. The method according to claim 1, wherein the visual indicator comprises text.

11. The method according to claim 1, further comprising:
creating another visual indicator based on another visual analysis or another audio analysis performed for the content displayed by the first device comprising at least one visual element; and
transmitting the another visual indicator to the second device,
wherein
the other visual indicator is selectable in the second device such that upon a selection of the visual indicator, access to the content of the first device is provided.

12. A computer program product embodied on a non-transitory computer-readable medium that when executed by at least one processor, causes a method according to claim 1 to be performed.

13. An apparatus, comprising:
at least one processor; and
at least one memory including computer program code;
the at least one memory and the computer program code being configured to, with the at least one processor, cause the apparatus at least to perform:
creating a visual indicator based on at least one of visual analysis or audio analysis performed for a content displayed by a first device comprising at least one visual element,
wherein the visual analysis comprises an algorithm capable of recognizing the at least one visual element and the audio analysis comprises an algorithm capable of recognizing an object or a context which correlates to the at least one visual element; and transmitting the visual indicator to a second device,
wherein the visual indicator is selectable in the second device such that upon a selection of the visual indicator, access to the content of the first device is provided.

14. The apparatus according to claim 13, wherein the content comprises part of a video content displayed by the first device.

15. The apparatus according to claim 14, wherein the at least one processor and at least one memory are further configured such that, upon providing access to the content, the content is accessed such that a part of the content accessed corresponds to the part of the content the at least one of visual analysis or audio analysis was performed for.

16. The apparatus according to claim 13, wherein the at least one of visual analysis or audio analysis is performed for a part of the content that is in a field of view of a user.

17. The apparatus according to claim 13, wherein at least one of the first device or the second device comprises a virtual reality device.

18. The apparatus according to claim 13, wherein the at least one of visual analysis or audio analysis is performed by a third device.

19. The apparatus according to claim 13, wherein the selection of the visual indicator is performed by the second device.

20. The apparatus according to claim 14, wherein the at least one of visual analysis or audio analysis is performed before the video content is displayed by the first device.

* * * * *